Dec. 20, 1966  M. F. SMITH  3,292,266
TEST GAGE
Filed May 1, 1964
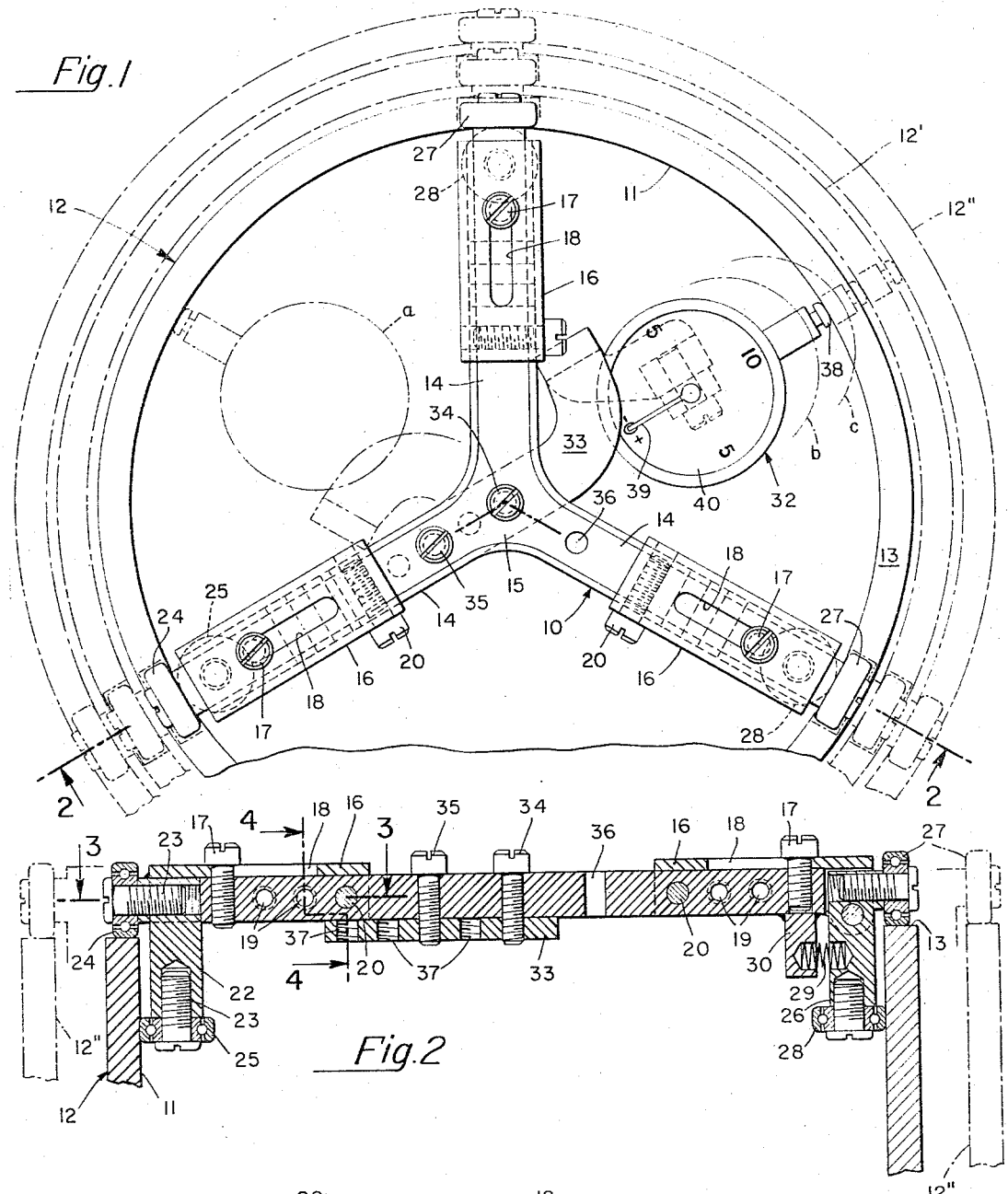
Fig.1
Fig.2
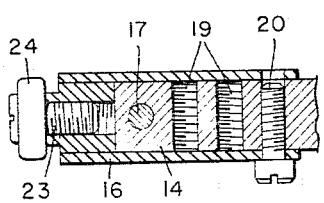
Fig.3
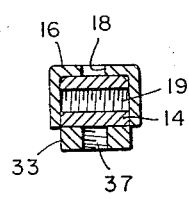
Fig.4
INVENTOR.
MILLARD F. SMITH
BY
Douglas R. McKenzie
ATTORNEY

United States Patent Office 3,292,266
Patented Dec. 20, 1966

3,292,266
TEST GAGE
Millard F. Smith, Detroit, Mich., assignor to The Budd Company, Philadelphia, Pa., a corporation of Pennsylvania
Filed May 1, 1964, Ser. No. 364,174
9 Claims. (Cl. 33—178)

This invention relates to a test gage for measuring circular objects and, more particularly, to a test gage for measuring the inner diameter and the ovality of automotive brake drums.

Automotive brake drums are commonly manufactured by casting a cylindrical brake drum on a drum head and thereafter machining the casting to given dimensions and tolerances to provide an inner cylindrical braking surface. Although there are many dimensions for specifying a brake drum such as bore taper, wobble, run-out, etc., the present invention is designed to measure the diameter of the braking surface and the ovality thereof. This latter term is also sometimes known as "rate of change" and is the difference in the lengths of two radii that intersect the braking surface at two points commonly spaced angularly apart 30° or 60°. Ovality, by way of example, can be specified as being no greater than, e.g., .0020" in any 60° of arc.

Accordingly, one of the objects of the invention is to provide a simple, low-cost, hand tool or gage for accurately measuring the diameter and the ovality of a brake drum.

Another object is to provide a gage that can be adjusted for measuring objects of different diameters.

Still another object is to provide a floating mechanical support for a sensor that allows the sensor to be rotated relative to the test object without frictionally binding on the test object so as to produce inaccurate readings.

Other objects and advantages of the invention will be apparent from the following description taken in connection with the accompanying drawing wherein:

FIG. 1 is a top plan view of a gage embodying the invention;

FIG. 2 is a vertical sectional view taken along reference lines 2—2 of FIG. 1;

FIG. 3 is a horizontal sectional view of a detail along reference lines 3—3 of FIG. 2; and FIG. 4 is a vertical sectional view along reference lines 4—4 of FIG. 3.

Referring now to the drawing, there is illustrated a gage 10 for measuring the diameter and the ovality of the braking surface 11 of a brake drum 12, the braking surface being cylindrical and of circular cross section and terminating at one end at an annular, transverse machined shoulder 13 which, when the gage is in place for measuring the drum, serves as a supporting and datum surface for the gage. Gage 10 is adjustable, as pointed out hereafter, so that it can be used to measure brake drums 12, 12', and 12" of different diameters, e.g., nine, ten and eleven inches respectively. Gage 10 comprises a hand-actuated, rotatable frame in the form of a spider having three, evenly-spaced radial arms 14 intersecting at a hub 15. Mounted on each arm is a channel 16 that is slidable along its length and along the arm between limits defined by a stop screw 17 screwed into the arm and passing through a slot 18 in the channel. Each arm 14 has three transverse, threaded, longitudinally-spaced bores 19 with which apertures in the channel can be aligned to receive a removable screw 20. This arrangement permits the channels to be adjusted to any one of three different positions to measure brake drums of different diameters. The channels, in effect, form adjustable portions of the frame.

One of channels 16 is rigidly connected at its outer end to a downwardly and outwardly extending member 22 that is connected to screws 23 which support ball bearing rollers 24 and 25 for rotation about mutually perpendicular axes. Each of the other two channels 16 is pivotally connected to a downwardly and outwardly extending member 26 connected to ball bearing rollers 27 and 28 that are rotatable about horizontal and vertical axes respectively. A lug 30 is attached to each arm 14 adjacent each member 26 and a helical compression spring 29 is held between lug 30 and member 26 for a purpose described hereafter.

As previously indicated, the frame is rotatable and rollers 25 and 28 rotate about axes parallel to and substantially equidistant from the axis of rotation of the frame. Rollers 24 and 27 rotate about axes that extend radially of the frame's axis, these rollers also being substantially equidistant from the frame axis. The pivotal axis of each member 26 is perpendicular to a radial line extending outwardly from the frame axis. When it is placed on the brake drum, the gage is supported by rollers 24 and 27 on surface 13 and of rollers 25 and 28 engage surface 11 so the frame's rotative axis is substantially coincident with the axis of the brake drum. The weight of the gage acting on rollers 27 pivots members 26 forcing rollers 28 against surface 11. This gravity bias is supplemented by springs 29 causing rollers 28 to maintain contact with the brake drum.

The resultant forces due to both rollers 28 pushing against surface 11 are equal and are directed along the arms 14 upon which they are mounted to produce a resultant force that is directed along the remaining arm and is opposed by roller 25 abutting surface 11 whereby roller 25 is maintained in constant contact with the brake drum. Thus, although arms 14 are evenly spaced 120° apart, it should be apparent that the arms upon which rollers 28 are mounted can be spaced differently but that, in order to develop the most effective bias on roller 25, the arm upon which it is mounted should extend in the direction of the combined force resulting from the bias on rollers 28. Where the bias is the same on each roller, then, the arm upon which roller 25 is mounted should bisect the reflex angle between the other two arms 14 to develop the most effective contact.

A dial indicator 32 is mounted on a bracket 33 secured to the frame by a first set screw 34 extending through the center of hub 15 and by a second set screw 35 which, as illustrated in FIG. 1, extends through a hole in arm 14 upon which roller 25 is mounted. A hole 36 is provided in one of the other arms 14 and is adapted to receive screw 35 whereby the dial indicator 32 and its support bracket 33 can be positioned in either of two alternate angular positions indicated by the full lines and by dotted lines a in FIG. 1 hereafter referred to as the diametrical position and the ovality position respectively. Bracket 33 has five threaded holes 37 that permit radial adjustment of the bracket 33 and dial indicator 32, when in either of these two alternate angular positions, to measure brake drums of three different diameters. For example, when the dial indicator is in the diametrical position shown in FIG. 1, it can be adjusted radially to positions b and c. Dial indicator 32 is of any conventional type and comprises a spring biased, reciprocal sensor 38 connected through the usual linkage to move a needle 39 in response to movement of the sensor and indicate by an indicator plate 40, graduated in the appropriate units, the amount of movement of the sensor. Bracket 33 supports the dial indicator so that sensor 38 extends radially of the axis of rotation of the frame and is effective, when the gage is placed on the brake drum, to indicate variations in this radial distance. Sensor 38 lies in the plane of rotation of roller 25.

In operation, it is preferred that a brake drum, prior to being measured, be oriented as shown in the drawing so that shoulder 13 faces upwardly. Prior to measuring, the gage 10 should be adjusted for the particular brake drum size and for the type of measurement, i.e., ovality or diametrical. Thereafter, the gage can be placed on the brake drum as illustrated in the drawing and rotated to obtain the desired measurement. Throughout such rotation, the bias of rollers 28 maintains roller 25 in contact with surface 11 and maintains the arm 14 upon which roller 25 is mounted in a radial position relative to surface 11.

If dial indicator 32 is set to the diametrical position, the placing of the gage on the brake drum positions sensor 38 so that it extends radially of surface 11 along a line that passes along a diameter of the brake drum and contains the point where roller 25 engages surface 11. Thus, it is effective to measure the inner diameter of the brake drum and upon rotation of the frame, variations in such diameter.

If dial indicator 32 is set to the ovality position, the placing of gage 10 on brake drum 12 positions sensor 38 so that it extends radially of surface 11 and abuts the surface at a point that is angularly spaced 60° from the point at which roller 25 abuts surface 11. In such a position, the dial indicator measures the radial difference between these two points and provides a measurement of the ovality of the brake drum.

Obviously, measurements taken with such a gage do not depend on "feel" of an operator so that highly accurate, reproducible readings are obtained. On a production line, it might be preferable to have one gage for each type of measurement and for each size brake drum, in order to eliminate the necessity of having to adjust a single gage for each different condition. Furthermore, while the illustrated gage is for an inner diameter, a gage can be constructed in accordance with the invention to measure outside diameters and ovality by providing a ring type frame. It will also be apparent that other changes can be made without departing from the scope of the invention as defined in the appended claims.

What is claimed is:

1. A test gage for measuring an object having a cylindrical surface and a transverse surface, comprising: a manually rotatable frame; a plurality of first rollers mounted on said frame and being engageable with said transverse surface for positioning said gage relative to said object; a plurality of second rollers engageable with said cylindrical surface, at least one of said second rollers being fixed radially relative to said frame; means biasing said frame for maintaining said one second roller in engagement with said cylindrical surface, said biasing means including at least one member pivotally mounted on said frame, at least one of said first rollers being mounted on said member, and at least one other of said second rollers being mounted on said member; and a measuring device mounted on said frame for measuring the distance from a point on said frame fixed relative to said one second roller to said cylindrical surface.

2. A test gage in accordance with claim 1 wherein said frame includes adjustable means for radially adjusting at least some of said rollers to measure objects of different nominal diameters.

3. A test gage in accordance with claim 1 wherein said measuring device is mounted on said frame by means that provides for angular adjustment of said device relative to said frame.

4. A test gage in accordance with claim 1 wherein said biasing means further includes a spring biasing said member.

5. A test gage for measuring the diameter and the ovality of a cylindrical surface of an object also having a transverse surface, comprising: a manually rotatable frame adapted to be disposed adjacent to said object; a plurality of first rollers for supporting said gage on said transverse surface; a plurality of second rollers engageable with said cylindrical surface for limiting rotation of said frame to rotation about an axis substantially coincident with the axis of said cylindrical surface; and a measuring device including a sensor mounted on said frame and adjustable between two alternate angularly spaced positions, said sensor being engageable with said cylindrical surface, when in said positions, for alternately measuring the diameter and the ovality of said cylindrical surface.

6. A hand-operated test gage for measuring the diameter and ovality of a brake drum, comprising: a manually actuated rotatable frame; at least one member pivotally mounted on said frame for rotation about an axis that extends perpendicular to a line drawn therefrom to the axis of rotation of said frame; a plurality of first rollers rotatable about axes that extend radially of the axis of rotation of said frame, one of said first rollers being mounted directly on said frame, another of said first rollers being mounted on said member; a plurality of second rollers rotatable about axes parallel to and equidistant from the axis of rotation of said frame, one of said second rollers being mounted directly on said frame, another of said second rollers being mounted on said member; and a measuring device mounted on said frame and being adjustable between alternate first and second positions, said measuring device having a biased reciprocable sensor that, when said measuring device is in said first position, lies along a line that passes through the axis of rotation of said frame and through said one second roller and that, when said measuring device is in said second position, lies along a line that passes through the axis of rotation of said frame and intersects, at an acute angle, a line passing through the axis of rotation of said frame and through said one second roller.

7. A test gage in accordance with claim 6 wherein said frame includes portions that are adjustable radially of the axis of rotation of said frame, and at least said one first roller, said one second roller and said member are mounted on said adjustable portions.

8. A hand operated gage for measuring the ovality and the diameter of a brake drum, comprising: a rotatable frame having a plurality of radial arms, a plurality of channels slidably mounted on said arms, releasable means for locking said channels in any one of a plurality of radial positions along said arms and at least one member pivotally mounted on the outer end of one of said arms for rotation about an axis extending across such arm; a plurality of first rollers mounted on said frame for rotation about axes that extend radially of the axis of rotation of said frame, one of said first rollers being mounted on said member; a plurality of second rollers mounted on said frame for rotation about axes parallel to the axis of rotation of said frame, one of said second rollers being mounted on one of said arms, another of said second rollers being mounted on said member; spring means biasing said another second roller radially outwardly; a bracket mounted on said frame, said bracket being adjustable between two alternate angular positions; and a dial indicator mounted on said bracket.

9. A gage in accordance with claim 8 wherein said bracket is further adjustable in both of said angular positions between a plurality of radial positions.

References Cited by the Examiner

UNITED STATES PATENTS

| | | | |
|---|---|---|---|
| 2,812,588 | 11/1957 | Verrant | 33—174 X |
| 2,831,261 | 4/1958 | Bunge | 33—178 |
| 2,938,272 | 5/1960 | Conklyn | 33—178 X |

OTHER REFERENCES

"Indicating Gages, etc.," article from American Machinist, Nov. 17, 1949, page 95.

LEONARD FORMAN, *Primary Examiner.*

SAMUEL S. MATTHEWS, *Examiner.*